United States Patent [19]
Fry

[11] Patent Number: 5,875,898
[45] Date of Patent: Mar. 2, 1999

[54] COMPOST PURIFICATION METHOD AND APPARATUS

[75] Inventor: Thomas Fry, Sun Valley, Calif.

[73] Assignee: Community Recycling & Resource Recovery, Inc., Sun Valley, Calif.

[21] Appl. No.: 609,112

[22] Filed: Feb. 29, 1996

[51] Int. Cl.[6] .................................................. B07B 9/00
[52] U.S. Cl. .............................. 209/28; 209/643; 209/311
[58] Field of Search ........................... 209/21–23, 26–29, 209/643, 674, 675, 680, 682, 311–313, 321, 314

[56] References Cited

U.S. PATENT DOCUMENTS

| | | | |
|---|---|---|---|
| 8,063 | 4/1851 | Etnier | 209/26 |
| 362,766 | 5/1887 | McKeen | 209/28 |
| 1,233,965 | 7/1917 | Bishop et al. | 209/27 |
| 3,587,851 | 6/1971 | Anderson | 209/643 |
| 4,913,804 | 4/1990 | Muller | 209/44.2 |
| 5,074,992 | 12/1991 | Clinton | 209/19 |
| 5,203,665 | 4/1993 | Lande | 414/412 |
| 5,219,078 | 6/1993 | Hadden | 209/314 |
| 5,328,034 | 7/1994 | Davis | 209/31 |
| 5,339,961 | 8/1994 | Mayhak | 209/3 |
| 5,462,172 | 10/1995 | Kumagai et al. | 209/12.1 |

FOREIGN PATENT DOCUMENTS

| | | | |
|---|---|---|---|
| 157378 | 12/1979 | Japan | 209/23 |
| 194121 | 2/1938 | Switzerland | 209/314 |

*Primary Examiner*—Boris Milef
*Attorney, Agent, or Firm*—Christie, Parker & Hale, LLP

[57] ABSTRACT

Mature particulate compost containing plastic film fragments resulting from the comminution of green waste and the bags containing them, is freed of the plastic fragments during screening of the compost by drawing air upwards through the compost into at least one plenum chamber at a velocity sufficient to lift the plastic film fragment into the plenum chamber substantially free of compost.

10 Claims, 2 Drawing Sheets

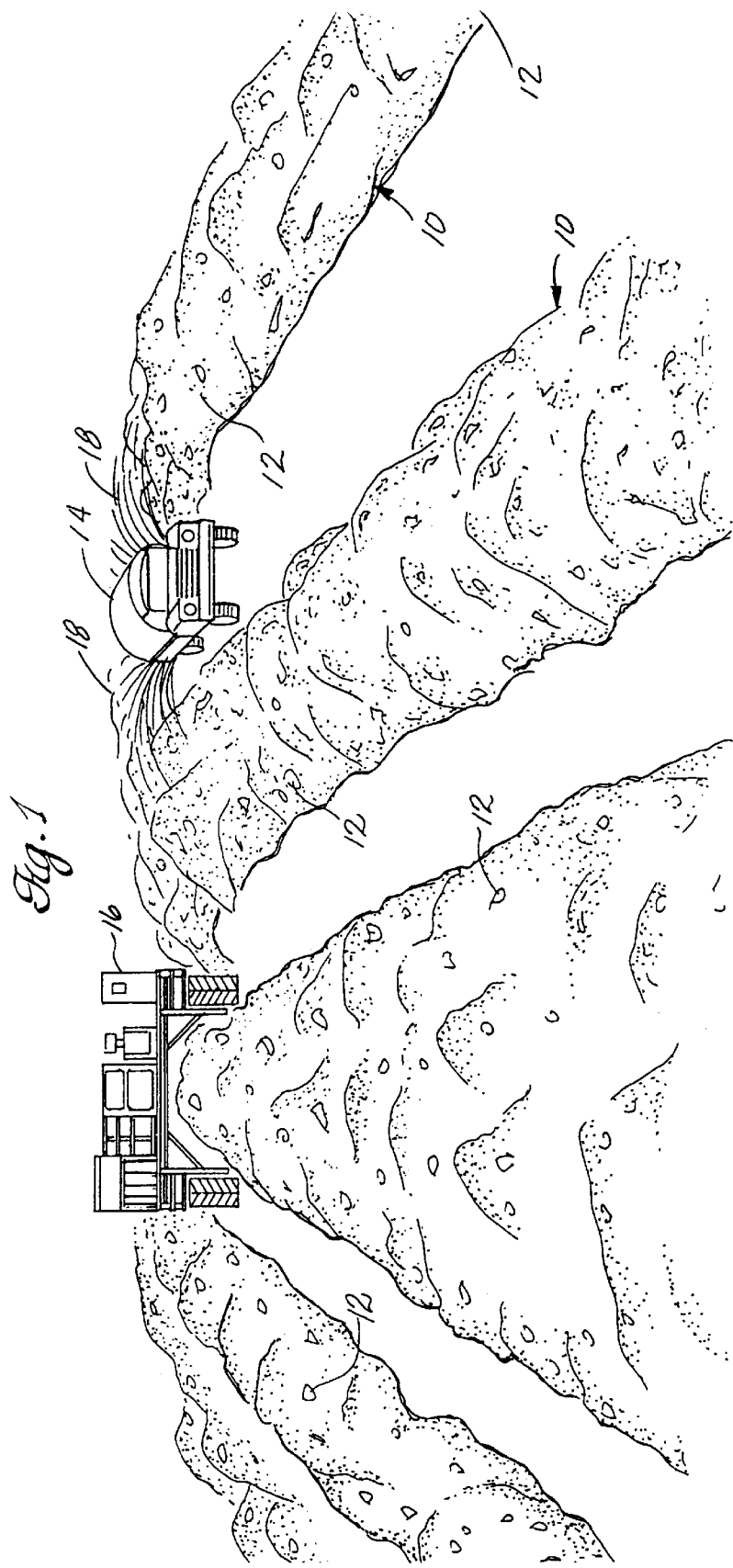

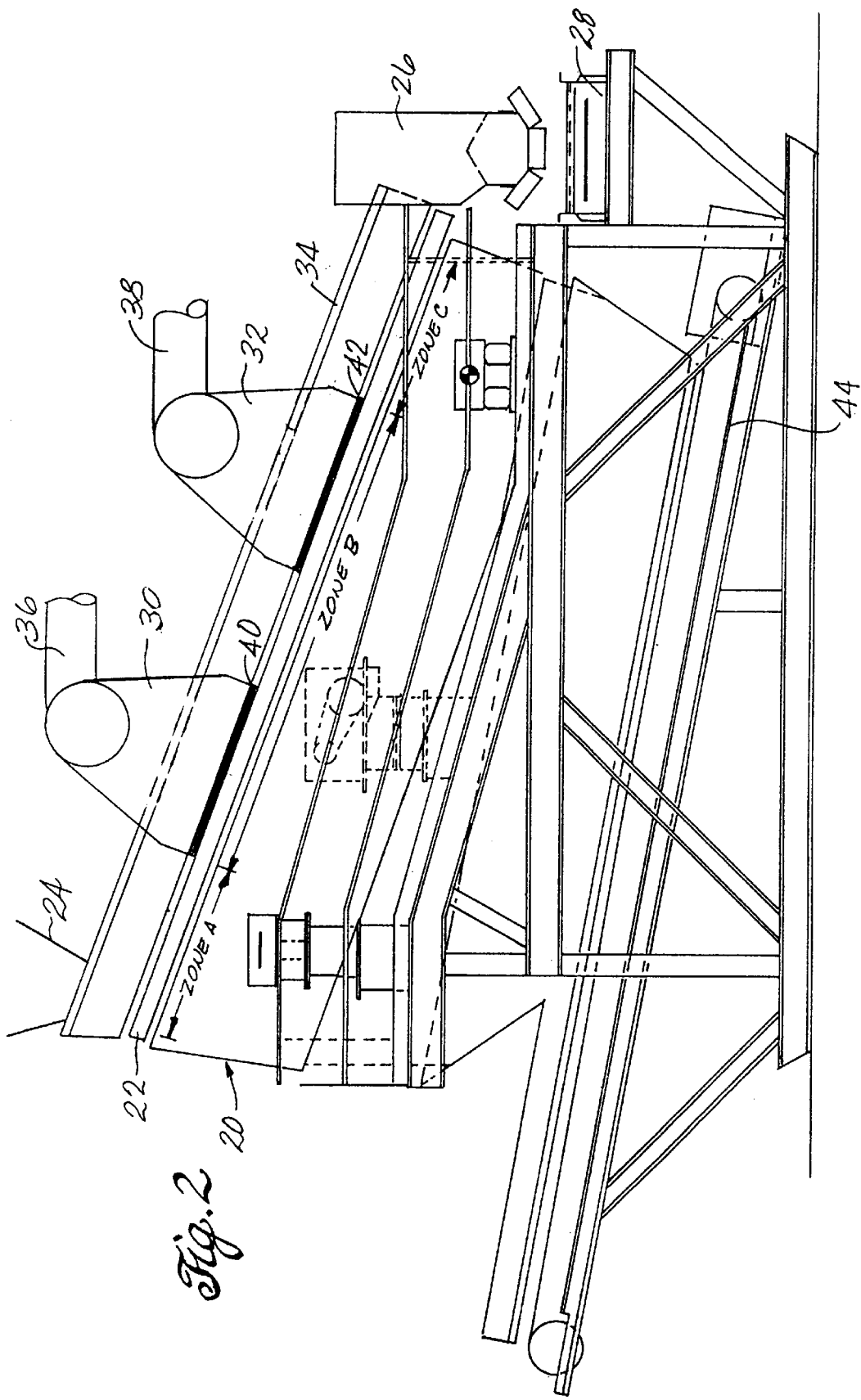

COMPOST PURIFICATION METHOD AND APPARATUS

BACKGROUND OF THE INVENTION

Compost is largely decayed organic matter which is utilized as a fertilizer for soil. It is formed by bacterial digestion of lawn cuttings, tree cuttings, ground Christmas trees, farm and garden waste, unsalable produce and the like. The cuttings may be of any size and may be ground at the time a compost pile is formed.

The pile of cuttings, which may be termed "green waste," is allowed to stand in a moist condition as bacterial action causes decay and eventually turns brown.

Sources for compost include yard clippings, which are typically bagged in plastic bags, unsalable produce such as fruits and vegetables which are also contained in plastic bags, and find their way, bagged, to garbage dumps. As the contents for forming compost must normally be reduced in size to facilitate the decaying operation, it is convenient to reduce the size of the raw materials while in their bags. This develops film fragments.

The green waste is usually ground to a size that will pass through a six to eight inch (6–8") screen. Plastic bags will usually shred to strips of 12" or more in length and occupy about one to two percent (1–2%) by weight of the green waste. In any operation of separating mature or stable compost into fractions of desired size from oversize, the plastic will concentrate in the oversize and also tend to clog screens used for sizing of the compost.

Since the oversize has the utility of being combinable with fresh green waste to generate the new compost, it is desirable to eliminate the shredded plastic film from the compost at some stage in its processing.

This is the subject of the instant invention.

SUMMARY OF THE INVENTION

According to the present invention, there is provided a method and apparatus for elimination of waste plastic film from compost undergoing a processing.

The process of the invention comprises passing a mixture of particulate, committed, stabilized compost containing waste plastic film fragments from bags over a plurality of vibrating screens of progressive, increasing mesh size and at some defined zone drawing air upwards through the screen to elute out the fragments of plastic film. Screening is by particle size. The compost is formed by grinding compostable organic waste into compost heaps and allowing it to decay until sufficiently mature for processing.

The first screen preferably of about ¼ inch square mesh (¼"×¼"), a mid-sized screen of about ⅜ to ½ inch square mesh (⅜"×⅜" to ½"×½"), and a final screen of larger size. The screening employed is preferably a non-blinding vibrating screen.

The mature compost, after passing over a first zone of ¼ inch mesh screen is passed through a first suction zone where air is drawn through the screen and compost at a velocity of about 5–10 feet per second, then passed through a second suction zone of higher velocity, typically from 10–15 feet per second, and then finally through a final screening zone. The oversize compost particles, which are substantially free of retained plastics, are discharged or recycled by combining with the fresh compost. As such it provides a bacterial infusion to the fresh compost to facilitate digestion of the green waste and further digestion of the oversized compost.

The apparatus used to carry out the invention consists of an inclined, non-blinding, vibrating screen, having a first zone of screen for small particles, a midsized zone for intermediate sized particles and a final screening zone for the largest particles to be recovered. Extending across the width of the screen bed are two tapered plenum chambers coupled to one or more wheel blowers. The first low velocity chamber has a length sufficient to extend the width of the screen bed, a width of about three feet (3'). The second high velocity chamber at about 2 feet (2') wide. The chambers converge towards a blower outlet, with velocity of air increasing as air is sucked into the converging chamber through the compost.

BRIEF DESCRIPTION OF DRAWINGS

FIG. 1 depicts a compost heap and illustrates the presence of waste plastics.

FIG. 2 illustrates the apparatus used for removing plastic waste from compost.

DETAILED DESCRIPTION

With reference now to FIG. 1. compost is formed by grinding organic waste comprising bagged cuttings, clippings and unsalable produce to a reduced size, preferably of a size that will pass through a screen having a hole size of 6 inches square (6"×6") or more. Any plastic containers (bags) for the green waste is ground with the green waste and remains with it until separated in accordance with the invention.

The green waste is stored in wind-rows 10 containing plastic fragments 12 spaced to a wetting truck 14 as well as a wind-row former/processor. The fragments of plastic bags are normally in segments to about 12–20 inches long. The compost is kept wet by a spray of water 18 on the pile from truck 14 and allowed to stand until sufficiently digested or mature for separation according to size.

When mature or stabilized, the compost is transferred to a collection truck (not shown), which transports the compost to a vibrating screen separator 20 for segregation according to size. Separator 20 consists of a non-blinding vibrating screen and associated means to deliver the compost to the screens and process it into "accept" and "reject".

It is preferred to employ a screen with a screen bed 22 containing flexible screen mats which are dynamically tensioned and slackened by a screen box driver unit(s) (not shown). The screen box is accelerated by 3.5 g, the bulk receives up to 50 g. This materially aids in preventing blinding or pegs. Oscillation of the screen frame, which is similar to a ladder in construction, is caused by connection to rubber blocks at the screen deck 22 level, which in turn are activated by the vibration of the screen box (not shown). The rubber blocks act as spring elements for the oscillation system. Operation is quite quiet with minimum vibration transmitted to the support structure. The screen mats are typically-full width formed of polyurethane and flexible oscillation systems, which operate at different amplitudes, but at the same frequency to generate the non-blinding action.

The non-blinding vibrating screen system is described, for instance, in U.S. Pat. Nos. 4,169,788 to 5,062,949 incorporated herein by reference, and manufactured by Aggregates Equipment, Inc. of Leola, Pa.

The screen is inclined at an angle of about 20° and is divided into multiple, preferably three, zones. The first zone or zones separate out small sized particles and typically has a hole size of about ¼ inch square (¼"×¼"). Smaller or larger holes can be employed. An intermediate zone contains holes of a larger size, typically ⅜"×⅜" to ⅝"×⅝" and more typically about ½"×½". The coarser zone typically contains screens of holes ¾"×¾" to 1"×1".

Committed, particulate compost enters screen deck 22 from hopper 24 and passes through a zone A of finest screen size. From there, it passes through zone B of a larger screen size, and then to a larger screen size in zone C for final recovery of largest compost particles. Maximum screen size may be anywhere from ½"×½" to 1"×1", depending on the market. It is to be understood that more or less screen sections may be employed, but to no great advantage.

After final separation, the oversized particles are passed to the discharge conduit 26 and deposited onto conveyer 28 for recycling to freshly made green waste to help initiate and promote the digestion of the green waste. The recycled compost is substantially free of plastic due to removal in an exhaust system and prevented thereby from concentrating in the green waste and, ultimately, the compost.

The Plastic Waste Separation System

One or more, preferably two (2) plenum chambers 30 and 32 are coupled to frame 34 positioned above the screen deck 22 and act in cooperation with a wheel blower system 36 and 38 to draw air through the bed of compost counter-current to the passage of compost through the screen. The air lifts the waste plastic fragments from the bed. The fragments are drawn by suction into the plenum chambers. The plenum chambers have converging walls which cause velocity to increase as the exhaust of the plenum chamber is approached. The plenum chambers typically have a length coextensive with a width of the screen deck and sealed to screen bed 22 with flexible rubber seals 40 and 42. Plenum chamber 30 has a width in machine direction of about three feet (3') and draws air through the bed of compost at a rate of about 5 to about 10 feet per second. Plenum chamber 32, by contrast, is smaller, having a width of about 2 feet (2') and draws air at higher velocity, of about 10 to about 15 feet per second. As depicted, the plenum chambers are positioned over the mid-section (zone B) of the bed so as not to draw in the finer sized compost from zone A. Purification is typically completed by the time the compost reaches zone C. The plenum chambers could, however, extend into zone A and/or zone C.

The waste plastic which is recovered is recycled or disposed of in a landfill. Compost which passes through the screens is separately recovered or combined in conveyor 40.

The compost which passes through the screen is, as indicated, conveyed away from the screen deck, packaged and sold to the agricultural and horticultural markets. As indicated above, oversized particles goes back to the compost and mixed with the green waste to continue the digestion action to break down both the green waste and the oversize.

In process, the screen size in zone A is sufficiently small to prevent plastic from entering the product.

In zone B, the size of the compost is large enough not to enter the plenum chamber with the plastic while the suction and screen size inhibit plastic from passing through the screen.

In the final zone, plastic may pass through the screen and contaminate the compost, but is removed ahead of that zone.

What is claimed is:

1. The process for separation of plastic film impurities contained in committed particulate compost comprising the steps of:

passing stabilized particulate committed compost containing waste plastic film fragments over a plurality of zones of non-blinding, inclined, vibrating screens, the screens provided in at least three zones of progressively increasing mesh size comprising a first zone of fine mesh size, at least one intermediate zone of intermediate mesh size, and a final zone of large mesh size; and drawing air through the screens of the at least one intermediate zone counter-current to the downward flow of screened compost and upwards into at least two plenum chambers at a velocity sufficient to elutriate the fragments of plastic film from the compost substantially free of the compost wherein the air is drawn from a first portion of the intermediate zone into a first of the plenum chambers at a velocity of from about 5 to about 10 feet per second and through a second portion of the intermediate zone into a second of the plenum chambers at a velocity of from about 10 to about 15 feet per second.

2. A process as claimed in claim 1 in which the mesh sizes of the screens range in size from ¼ inch to 1 inch, with the intermediate zone having a mesh size of about ⅜ inch to about ⅝ inch.

3. A process as claimed in claim 1 in which the first zone of screens is of a mesh size of about ¼ inch the intermediate zone of screens is of a mesh size of about ½ inch, and the final zone of screens is of a mesh size larger than about ½ inch.

4. Apparatus for the separation of committed plastic film fragments from committed compost comprising:

a non-blinding, vibrating, inclined screen separator having a first zone of screens of a first mesh size, an intermediate zone of screens containing screens of a mesh size greater than the mesh size of the screens of the first zone, and a final zone of screens of a mesh size greater than the mesh size of the screens of the intermediate zone, and positioned at a level above the intermediate screen zone;

a first plenum chamber coupled to means for drawing air through the screens of a first portion of the intermediate zone at a first velocity sufficient to separate a first portion of the waste elastic film fragments from the committed compost into a first plenum chamber, the first plenum chamber extending downstream across the screens of the first portion of the intermediate zone; and a second plenum chamber placed downstream of the first plenum chamber and adapted to enable air to be drawn through the screens of a second section of the intermediate zone and into the second plenum chamber at a second velocity sufficient to separate a second portion of the waste plastic film fragments from the committed compost, the second velocity being greater than the first velocity.

5. An apparatus as claimed in claim 4 in which the means for drawing air through the screens of the intermediate zone comprises a wheel blower independently coupled to each plenum chamber.

6. An apparatus as claimed in claim 5 in which the first plenum chamber is adapted to draw air at a velocity of from about 5 to about 10 feet per second, and the second plenum chamber is adapted to draw air at a velocity of from about 10 to about 15 feet per second.

7. An apparatus as claimed in claim 6 in which each plenum chamber has a length coextensive with the width of the inclined vibrating screen and in which the first plenum chamber has a width of about 3 feet in the machine direction and the second plenum chamber a width of about 2 feet in the machine direction.

8. An apparatus as claimed in claim 5 in which each plenum chamber has a length coextensive with the width of the inclined vibrating screen and in which the first plenum chamber has a width of about 3 feet in the machine direction and the second plenum chamber a width of about 2 feet in the machine direction.

9. An apparatus as claimed in claim 4 in which the first plenum chamber is adapted to draw air at a velocity of from about 5 to about 10 feet per second, and the second plenum chamber is adapted to draw air at a velocity of from about 10 to about 15 feet per second.

10. An apparatus as claimed in claim 4 in which each plenum chamber has a length coextensive with the width of the inclined vibrating screen and in which the first plenum chamber has a width of about 3 feet in the machine direction and the second plenum chamber a width of about 2 feet in the machine direction.

\* \* \* \* \*

UNITED STATES PATENT AND TRADEMARK OFFICE
CERTIFICATE OF CORRECTION

| | |
|---|---|
| PATENT NO. : | 5,875,898 |
| DATED : | March 2, 1999 |
| INVENTOR(S) : | Thomas Fry |

It is certified that error appears in the above-identified patent and that said Letters Patent is hereby corrected as shown below:

Column 1, line 43, replace "committed" with-- comminuted --.
Column 1, line 53, replace (⅜"x⅜ to ½"x½") with -- (⅜"x⅜" to ½"x½") --.
Column 3, line 6, replace "Committed" with -- Comminuted --.
Column 3, lines 64,66, replace "committed" with -- comminuted-- (both occurrences).
Column 4, lines 26,27,40,48, replace "committed" with -- comminuted-- (all occurrences).
Column 4, line 39, replace "elastic" with -- plastic --.

Signed and Sealed this

First Day of August, 2000

Q. TODD DICKINSON

*Attest:*

*Attesting Officer*  *Director of Patents and Trademarks*